(12) United States Patent
Thai

(10) Patent No.: US 6,185,281 B1
(45) Date of Patent: *Feb. 6, 2001

(54) AUTOMATED TESTING OF A TELECOMMUNICATIONS PLATFORM

(75) Inventor: Victor M. Thai, Dallas, TX (US)

(73) Assignee: Alcatel USA Sourcing, L.P., Plano, TX (US)

( * ) Notice: Under 35 U.S.C. 154(b), the term of this patent shall be extended for 0 days.

This patent is subject to a terminal disclaimer.

(21) Appl. No.: 09/480,125

(22) Filed: Jan. 10, 2000

Related U.S. Application Data

(63) Continuation of application No. 08/990,552, filed on Dec. 15, 1997, now Pat. No. 6,014,424.

(51) Int. Cl.[7] .................................................. H04M 1/24
(52) U.S. Cl. .............................. 379/15; 379/1; 379/201
(58) Field of Search ............................ 379/1, 9, 10, 11, 379/12, 13, 14, 15, 32, 34, 111, 112, 113, 133, 134, 201

(56) References Cited

U.S. PATENT DOCUMENTS

| | | | |
|---|---|---|---|
| 5,721,753 | 2/1998 | Ehler et al. | 379/14 |
| 5,740,233 | 4/1998 | Cave et al. | 379/113 |
| 5,761,272 | * 6/1998 | Williams et al. | 379/10 |
| 5,778,049 | * 7/1998 | Young et al. | 379/10 |
| 5,838,766 | * 11/1998 | Rand | 379/9 |
| 5,854,823 | * 12/1998 | Badger et al. | 379/15 |
| 6,055,298 | * 4/2000 | Sugimoto | 379/9 |

* cited by examiner

Primary Examiner—Curtis A. Kuntz
Assistant Examiner—Binh K. Tieu
(74) Attorney, Agent, or Firm—Baker Botts L.L.P.

(57) ABSTRACT

A system for automatically testing a telecommunications platform comprises an application file and a telecommunications platform (TP) testing program. The application file has at least one data line corresponding to an application resident on the telecommunications platform. The telecommunications platform (TP) testing program is operable to access the application file, to invoke at least one utility program for checking the application, and to compare result information generated by the utility program against the data line of the application file.

13 Claims, 2 Drawing Sheets

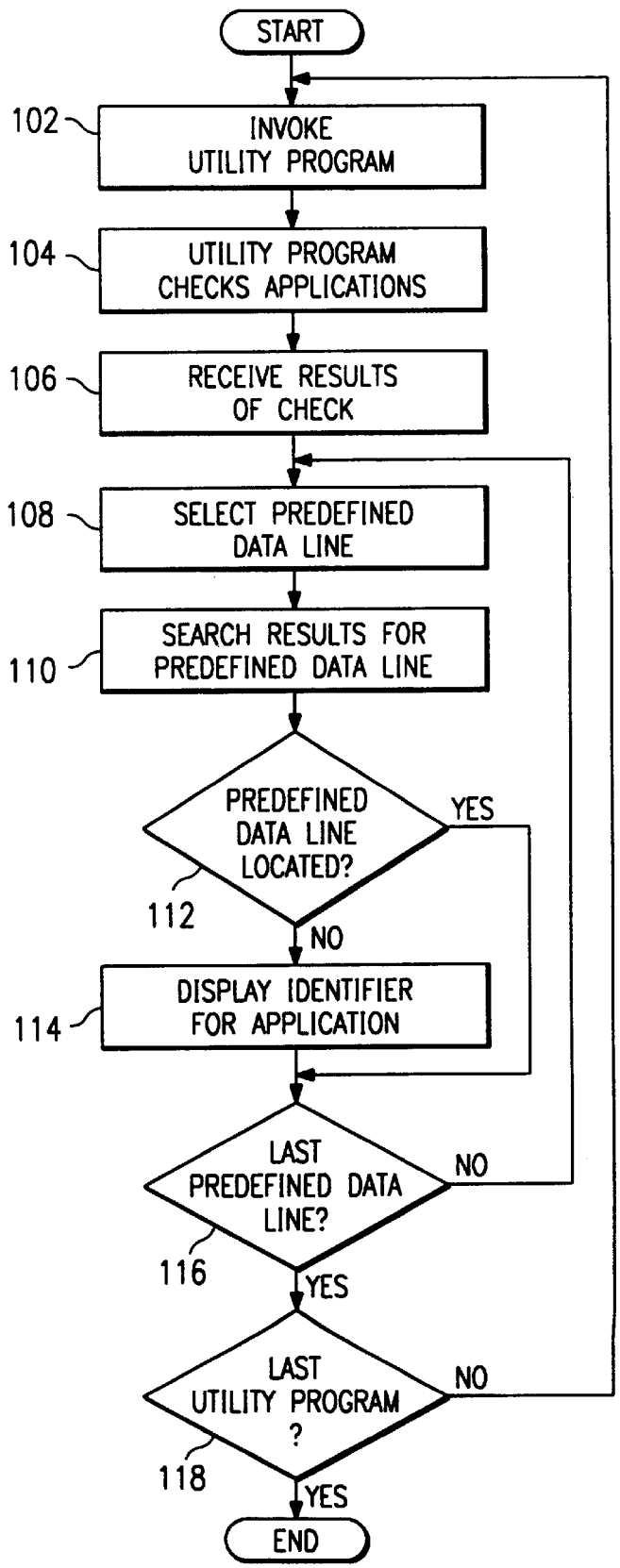

AUTOMATED TESTING OF A TELECOMMUNICATIONS PLATFORM

This application is a continuation of U.S. application Ser. No. 08/990,552 filed Dec. 15, 1997, now U.S. Pat. No. 6,014,424.

TECHNICAL FIELD OF THE INVENTION

The present invention relates generally to the field of testing, and more particularly to the automated testing of a telecommunications platform.

BACKGROUND OF THE INVENTION

In the architecture for a modern telecommunications system, one or more telecommunications platforms may provide interoperability of services and functionality across multiple network technologies, applications, and access types, and also enhanced security and mediated access. Each telecommunications platform may comprise a number of software elements or applications which support a variety of communications, including, but not limited to, local telephony, toll (i.e., long-distance), wireless, intelligent network (IN), and residential video.

Previously, in order to test the operation of these software applications, a human user was required to periodically invoke one or more utility programs, wait for the utility programs to check each application, and then review the information output by the utility programs as a result of the checks. This previous technique for testing the software applications on a telecommunications platform was problematic for numerous reasons. For example, because the amount of result information generated by each utility program could be voluminous, the process of reviewing such information was generally tedious, time consuming, and inefficient. Furthermore, given the amount of result information, it was often difficult for a human user to identify software applications which were not operating properly.

SUMMARY OF THE INVENTION

In accordance with the present invention, the disadvantages and problems associated with previous techniques for testing applications in a telecommunications platform have been substantially reduced or eliminated.

In one aspect of the present invention, a system for automatically testing a telecommunications platform comprises an application file and a telecommunications platform (TP) testing program. The application file has at least one data line corresponding to an application resident on the telecommunications platform. The telecommunications platform (TP) testing program is operable to access the application file, to invoke at least one utility program for checking the application, and to compare result information generated by the utility program against the data line of the application file.

In another aspect of the present invention, a method for automatically testing a telecommunications platform, comprises the following steps: invoking a utility program for checking an application resident on the telecommunications platform; receiving result information generated by the utility program, the result information comprising at least one result line; accessing an application file having at least one data line corresponding to the application; and comparing the received result information against the data line of the application file.

Important technical advantages of the present invention include automatically testing applications on a telecommunications platform. This is accomplished by providing a telecommunications platform (TP) test program and a number of pattern files. The TP test program invokes one or more utility programs for checking the applications on the telecommunications platform. Each utility program generates result information, which may comprise a separate result line for each application checked by the utility program. Each pattern file may be associated with a particular utility program and may contain a number of data lines. The data lines are predefined to correspond to result information that would be generated by the utility program if it found that each application was operating properly. The TP test program may compare the result information generated by the utility programs against associated pattern files. If no result line in the result information matches a data line in an associated pattern file, the TP test program will present a user with an identifier for an application corresponding to the data line. This notifies the user that such application is not operating properly. Because a human operator is not required to either invoke the utility programs or review the result information output by each utility program, the present invention provides a more efficient and effective way to test applications on a telecommunications program.

Other important technical advantages are readily apparent to one skilled in the art from the following figures, description, and claims.

BRIEF DESCRIPTION OF THE DRAWINGS

For a more complete understanding of the present invention and for further features and advantages, reference is now made to the following description taken in conjunction with the accompanying drawings, in which:

FIG. 3 is a flow chart of a method for automatically testing the applications on the telecommunications platform, in accordance with an embodiment of the present invention.

DETAILED DESCRIPTION OF THE INVENTION

Figure 1:
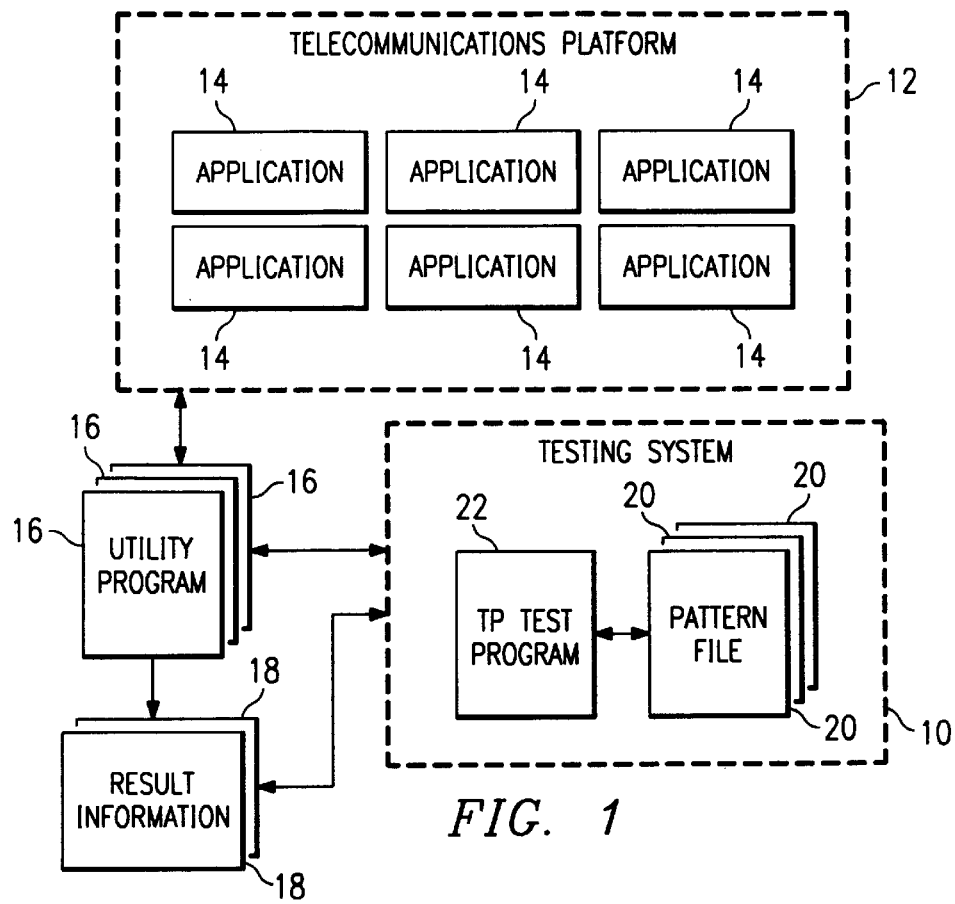
FIG. 1 illustrates an environment in which a system for automatically testing a telecommunications platform may operate, in accordance with an embodiment of the present invention.
Figure 2:
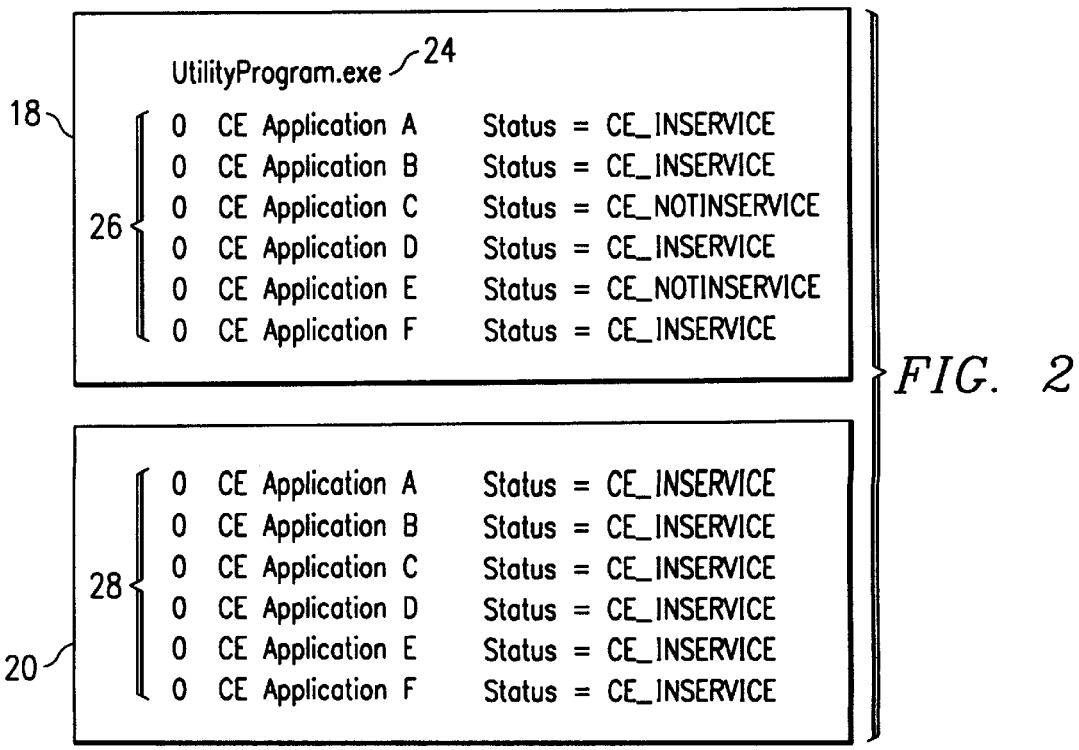
FIG. 2 illustrates exemplary result information and pattern file, in accordance with the present invention.

The preferred embodiment of the present invention and its advantages are best understood by referring to FIGS. 1–3 of the drawings, like numerals used for like and corresponding parts of the various drawings.

Turning first to the nomenclature of the specification, the detailed description which follows is represented largely in terms of processes and symbolic representations of operations by conventional computer components, such as a central processing unit ("CPU") or processor associated with a general purpose computer system, memory storage devices for the processor, and connected pixel-oriented display devices. These operations include the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process, method, routine, or sub-routine is generally considered to be a sequence of computer-executed steps leading to a desired result. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, texts, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, or the like, which are often associated with manual operations performed by a human operator. It must be understood that no involvement of the human operator may be necessary, or even desirable, in the present invention. The operations described herein are machine operations performed in conjunction with the human operator or user that interacts with the computer or computers.

In addition, it should be understood that the programs, processes, methods, and the like, described herein are but an example of one implementation of the present invention and are not related or limited to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hardwired logic or programs stored in non-volatile memory, such as read only memory (ROM).

Referring now to the drawings, FIG. 1 illustrates an environment in which a system 10 for automatically testing a telecommunications platform 12 may operate, in accordance with an embodiment of the present invention.

In this environment, telecommunications platform 12 may comprise a combination of hardware and software elements which support a broad range of products and services appropriate for multiple applications, including, but not limited to, local systems, long-distance systems, global network systems, broadband systems, wireless systems, cable systems, computer telephony integration (CTI) systems, and universal personal services (UPS) systems. The hardware elements, although not explicitly shown in FIG. 1, may include one or more processors, storage devices, interfaces, hardwired connections, and the like. The software elements may include a number of applications 14. Each of these applications 14 can be implemented as computer code operable to be stored in, and run on, one or more suitable hardware elements of telecommunications platform 12. Applications 14 may provide such functionality as managing events, controlling configuration, and maintaining operations within telecommunications platform 12. In addition, applications 14 may support interfacing and communication with elements external to platform 12. Each application 14 may operate in conjunction with, or independently of, the other applications 14. Although six applications 14 are illustrated in FIG. 1, it should be understood that in other embodiments, any other number of applications 14 may be included in telecommunications platform 12.

One or more utility programs 16 can be invoked in order to check applications 14. Each utility program 16 may be implemented as computer code stored in a suitable hardware element which may be integral to, or separate from, telecommunications platform 12. The utility programs 16 may separately identified, for example, with individual identifiers such as "CE-Look" or "Q-Look." Utility programs 16 comprise various testing commands, routines, cases, patterns, scripts, or the like, which can be input into one or more application 14 to check the operation of such applications. In one embodiment, each utility program 16 may be provided to test a particular function or group of functions for one or more applications 14. Each utility program 16 is further operable to generate or output result information 18 in response to the check of applications 14. In one embodiment, this result information 18 may comprise one or more statements specifying whether the applications 14 are operating properly. Exemplary result information 18 is illustrated and described in more detail below with reference to FIG. 2.

Testing system 10, as shown, includes one or more pattern files 20 and a telecommunications platform (TP) test program 22. Each pattern file 20 may be associated with one or more utility programs 16; in a preferred embodiment, a separate pattern file 20 is provided for each utility program 16. Each pattern file 20 may include one or more data lines of textual information. In one embodiment, these data lines are predefined to be the same as, or substantially similar to, certain result information 18 that can be returned by a utility program 16. Specifically, each predefined data line may comprise a statement that a particular application 14 is operating properly.

TP test program 22 can be implemented as computer code which is stored in a suitable hardware element residing on, or separate from, telecommunications platform 12. Generally, TP test program 22 can be used to automatically test the applications 14 within telecommunications platform 12 by invoking one or more utility programs 16, receiving the result information 18 output by each invoked utility program 16, and reviewing this result information 18 against data contained within one or more associated pattern files 20. To accomplish this, TP test program 22 may comprise or utilize a "string search" utility; such string search utility is operable to search information or data in order to identify a particular pattern or string of text. For each application 14 that is checked by a utility program 16, TP test program 22 may search the result information 18 output by the utility program to find a string of text identical to the predefined data line for that application 14. If such a string of text is not found, TP test program 22 is operable to present information to a user indicating that such application 14 is not fully operational.

FIG. 2 illustrates exemplary result information 18 and pattern file 20, in accordance with the present invention. Exemplary result information 18 may be output by a utility program 16 in response to a check performed on one or more applications 14 of a telecommunications platform 12. Result information 18 comprises an execution line 24 and one or more result lines 26. Execution line 24 specifies a name or other identifier for the utility program 16 which generated the result information 18. Each result line 26 may include the name of an application 14 that was checked by the utility program 16. As shown, these applications 14 are named "Application A," "Application B," "Application C," "Application D," "Application E," and "Application F." Each result line 26 may also include statement indicating whether the corresponding application 14 was found to be operating properly or not. In one embodiment, for a properly operating application 14, the result line 26 may recite "Status=CE_INSERVICE"; for an application which is not operating properly, the result line 26 may recite, "STATUS=CE_NOTINSERVICE".

Exemplary pattern file 20 may be associated with the utility program 16 outputting exemplary result information 18. Exemplary pattern file 20 comprises a plurality of predefined data lines 28, each of which corresponds to a particular application 14 checked by the utility program 16. Specifically, each predefined data line 28 comprises textual information specifying an identifier for the corresponding application 14 and a statement which indicates that such application 14 is operating properly; this statement recites "Status=CE_INSERVICE." As such, the predefined data lines 28 in pattern file 20 are the same as result lines 26 which would appear in result information 18 if every application 14 checked by the utility program 16 was found to be operating properly.

In accordance with the present invention, the exemplary result information 18 may be reviewed against the associated exemplary pattern file 20. Specifically, result information 18 may be systematically searched to find a match for each predefined data line 28 in pattern file 20. If a result line 26 in result information 18 matches a particular predefined data line 28, then the application 14 corresponding to such predefined data line is operating properly. If no matching result line 26 is found for a particular predefined data line in pattern file 20, the corresponding application 14 is not operating properly; in such case, the present invention notifies a user, for example, by displaying or presenting an identifier for such application 14.

FIG. 3 illustrates a flow chart of a method 100 for automatically testing a telecommunications platform 12, in accordance with an embodiment of the present invention. It is contemplated that method 100 may correspond to the operation of testing system 10 described herein.

Method 100 begins at step 102 where TP test program 22 of testing system 10 invokes a particular utility program 16. In one embodiment, TP test program 22 automatically enters and executes an execution line 24 (such as shown in FIG. 2) for the utility program 16. At step 104, the invoked utility program 16 checks one or more applications 14 of the telecommunications platform 12, for example, by inputting test patterns or cases. In response, each application 14 returns one or more outputs, from which the invoked utility program 16 generates result information 18. The result information 18 can specify whether each application 14 that was checked by utility program 16 is operating properly. In one embodiment, for each such application 14, the result information 18 may include a result line 26 identifying that application 14 and containing a statement which recites either "Status=CE_INSERVICE" (indicating that the application is functioning properly), or alternatively, "Status=CE_NOTINSERVICE" (indicating that the application is not functioning properly).

At step 106, TP test program 22 receives the result information 18 from the invoked utility program 16. TP test program 22 may then access a pattern file 20 associated with the utility program 16. This pattern file 20 contains a number of data lines 28, each of which corresponds to a particular application 14 checked by the utility program 16. The data lines 28 may each be predefined to be the same as, or substantially similar to, a result line 26 that would be output by utility program 16 if the corresponding application 14 was found to be operating properly.

TP test program 22 then selects a predefined data line 28 from the accessed pattern file 20 at step 108. At step 110, TP test program 22 searches the received result information 18 for a result line 26 which matches the selected predefined data line 28, for example, by using a string search utility.

At step 112, a determination is made whether the currently selected predefined data line 28 has been located—i.e., a matching result line 26 has been found—in the result information 18 output by utility program 16. If such predefined data line 28 is located within the result information 18, then the application 14 associated with this data line 28 is operating properly. Method 100 then moves to step 116. Alternatively, if the predefined data line 28 is not located within the result information, the application 14 associated with the predefined data line is not operating properly. Thus, at step 114, an identifier for the application 14 is displayed or presented to a user, thereby notifying the user of a problem with that application 14.

At step 116, TP test program 22 determines whether the currently selected predefined data line 28 is the last predefined data line within the accessed pattern file 20. If it is determined that the currently selected predefined data line 28 is not the last, then method 100 returns to step 108 where the next predefined data line 28 of pattern file 20 is selected. TP test program 22 repeats steps 108–116 until each predefined data line 28 from the accessed pattern file 20 is reviewed against the result information 18 output by the most recently invoked utility program 16.

When it is determined at step 116 that the currently selected predefined data line 28 is the last in the accessed pattern file 20, method 100 moves to step 118 where TP test program 22 determines whether the utility program 16 that was most recently invoked is the last utility program 16. If not, method 100 returns to step 102 where the next utility program 16 is invoked by TP test program 22. Steps 102–118 are repeated until all utility programs 16 have been invoked by TP test program 22 and the generated result information 18 is analyzed in order to identify applications 14 which are not operating properly, and a user is suitably notified. When it is finally determined at step 118 that the currently selected utility program 16 is the last, then method 100 ends.

In the manner described herein, the present invention automatically tests the operating capacity of one or more software applications residing on a telecommunications platform, and notifies a user about each application which is not found to be operating properly. Accordingly, a user is not required to either invoke utility programs or to review the result information generated therefrom. As such, the present invention provides an efficient and effective way to test a telecommunications platform.

Although the present invention and its advantages have been described in detail, it should be understood that various changes, substitutions, and alterations can be made therein without departing from the spirit and scope of the invention as defined by the appended claims.

What is claimed is:

1. A system for automatically testing a telecommunications platform, comprising:
   a pattern file having at least one data line corresponding to a particular one of a plurality of applications resident on the telecommunications platform;
   at least one utility program operable to check operation of the particular one of the plurality of applications, the pattern file being associated with the at least one utility program;

a telecommunications platform testing program operable to access the pattern file, to invoke the at least one utility program to check a particular function of the particular one of the plurality of applications, and to compare result information generated by the utility program against the data line of the pattern file in order to determine whether the particular function of the particular one of the plurality of applications is operating properly.

2. The system of claim 1, wherein the data line comprises a statement that the particular function of the particular one of the plurality of applications is operating properly.

3. The system of claim 1, wherein the data line is predefined to be substantially similar to a result line indicating that the particular function of the particular one of the plurality of applications is operating properly.

4. The system of claim 1, wherein the telecommunications platform testing program comprises a string search utility.

5. The system of claim 1, wherein the result information comprises at least one result line, the telecommunications platform testing program operable to present an identifier for the particular function of the particular one of the plurality of applications to a user if the data line of the pattern file does not match any result line within the result information.

6. A system for automatically testing a telecommunications platform, comprising:

a pattern file having at least one data line corresponding to a particular function of a particular one of a plurality of applications resident on the telecommunications platform, wherein the data line is predefined to be substantially similar to a result line indicating that the particular function of the particular one of the plurality of applications is operating properly;

a utility program operable to check operation of the particular function of the particular one of the plurality of applications, the pattern file being associated with the at least one utility program;

a telecommunications platform testing program operable to access the pattern file, to invoke the utility program for checking the particular function of the particular one of the plurality of applications, to compare result information generated by the utility program against the predefined data line of the pattern file, and to notify a user if the predefined data line of the pattern file does not match any result line within the result information.

7. The system of claim 6, wherein the telecommunications platform testing program is operable to present an identifier for the particular function of the particular one of the plurality of applications to a user.

8. The system of claim 6, wherein the telecommunications platform testing program comprises a string search utility.

9. A method for automatically testing a telecommunications platform, comprising the steps of:

invoking a utility program for checking a particular function of a particular one of a plurality of applications resident on the telecommunications platform;

receiving result information generated by the utility program, the result information comprising at least one result line;

accessing a pattern file having at least one data line corresponding to the particular function of the particular one of the plurality of applications; and comparing the received result information against the data line of the pattern file in order to determine whether the particular function of the particular one of the plurality of applications is operating properly.

10. The method of claim 9, further comprising the step of notifying a user if the data line of the pattern file does not match any result line within the result information.

11. The method of claim 9, wherein the step of comparing comprises the step of comparing the data line against each result line in the result information.

12. The method of claim 9, wherein the data line comprises a statement that the particular function of the particular one of the plurality of applications is operating properly.

13. The method of claim 9, wherein the data line is predefined to be substantially similar to a result line indicating that the particular function of the particular one of the plurality of applications is operating properly.

* * * * *